United States Patent [19]

Licata

[11] 3,735,020

[45] May 22, 1973

[54] HEAT SINK WALL PLATE WITH OFF-CENTER MOUNTING OPENINGS

[75] Inventor: Joseph Licata, Schnecksville, Pa.

[73] Assignee: Lutron Electronics Co., Inc., Coopersburg, Pa.

[22] Filed: Sept. 29, 1971

[21] Appl. No.: 184,861

[52] U.S. Cl. .................. 174/66, 174/55, 220/24, 220/2, 200/166 K
[51] Int. Cl. .............................................. H02g 3/14
[58] Field of Search ................. 174/55, 53, 66; 200/166 K, 168 C, 168 D; 339/112 R, 122 R, 132 R; 220/24, 2, 3, 92, 94; 313/46; 315/200

[56] References Cited

UNITED STATES PATENTS

| | | | |
|---|---|---|---|
| 3,058,020 | 10/1962 | Balan | 174/55 X |
| 3,037,146 | 5/1962 | Slater | 313/46 X |
| 2,212,145 | 8/1940 | Benander | 174/66 X |
| 2,891,866 | 4/1961 | Tsien et al. | 315/200 |
| 1,550,870 | 8/1925 | Braden | 220/3.94 X |

Primary Examiner—Bernard A. Gilheany
Assistant Examiner—D. A. Tone
Attorney—Ostrolewk, Faber, Gerb & Soffen

[57] ABSTRACT

A light control switch device for mounting in a wall box has a conductive front mounting plate arranged to overlap the edges of the wall extending around the opening receiving the wall box. Mounting-screw receiving openings are disposed in the wall plate, with one pair of openings aligned vertically centrally of the plate while two additional openings are formed on opposite sides of the center line of the plate, and in horizontal alignment with respective ones of the pair of centrally aligned openings. The spacing between a central opening and a laterally displaced opening is equal to one-half the distance between the screw-receiving openings of a standard wall box. The vertical edges of the wall plate are then provided with snap-off sections, where the distance between the two snap-off sections is equal to some multiple of the distance between the screw-receiving openings of a conventional wall box. Switch devices may then be ganged in a multiswitch wall box either with or without snap-off sections. The front surface of the conductive face plate contains heat-radiating fins.

21 Claims, 17 Drawing Figures

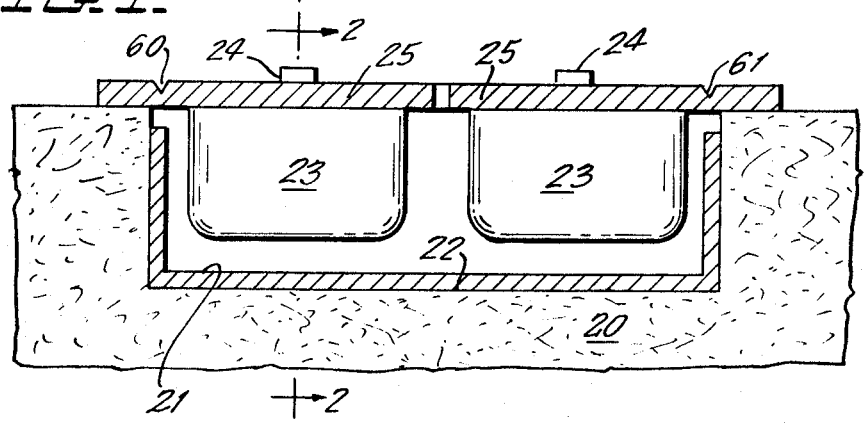
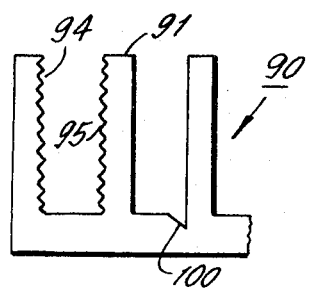
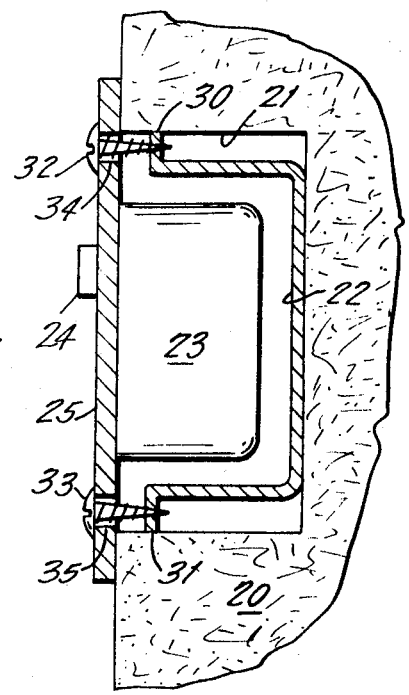
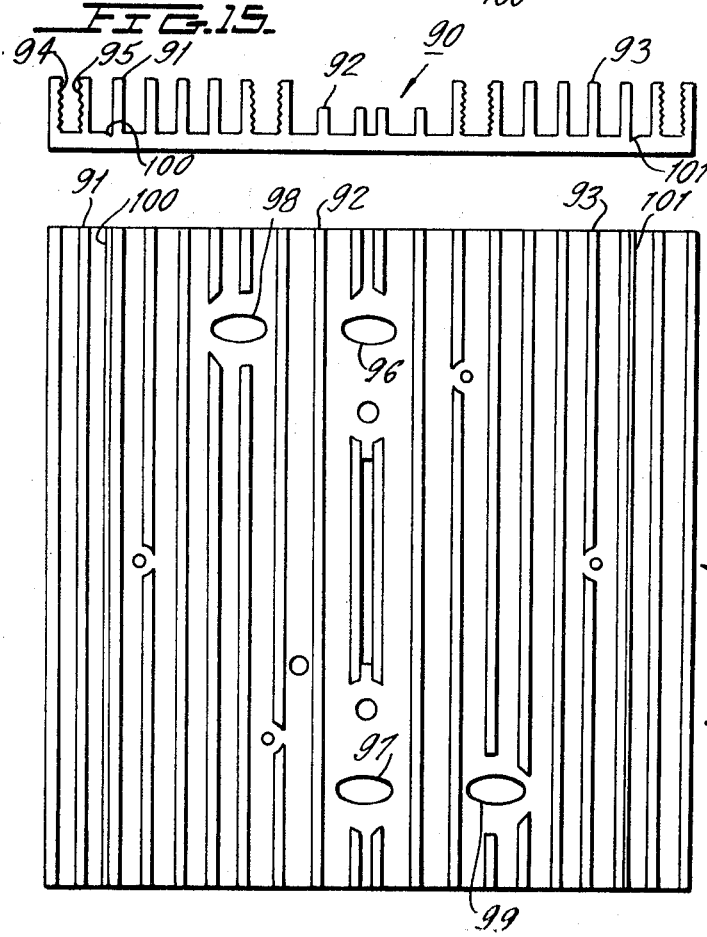
INVENTOR
JOSEPH LICATA
BY Ostrolenk, Faber, Gerb & Soffen
ATTORNEYS

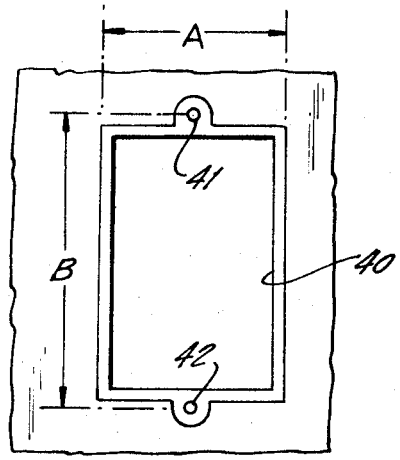
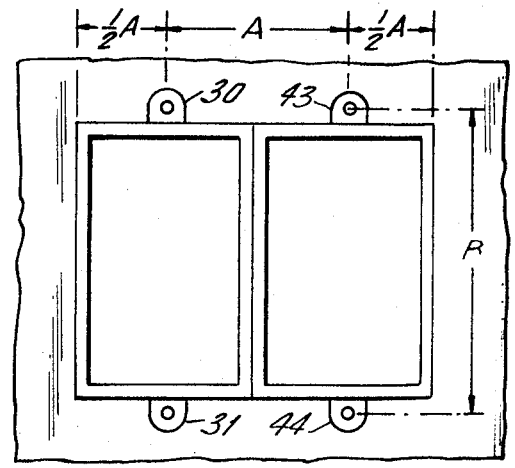
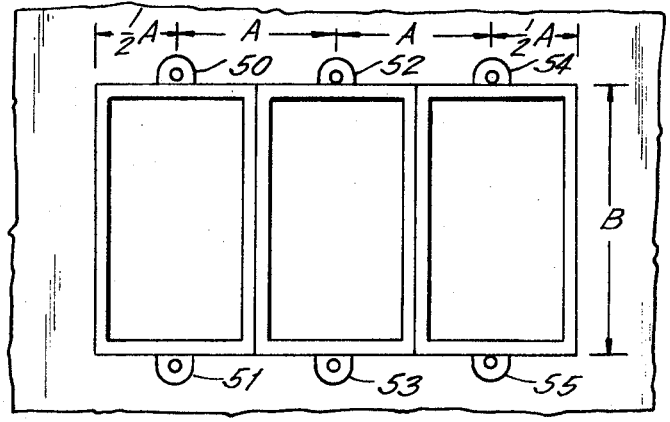
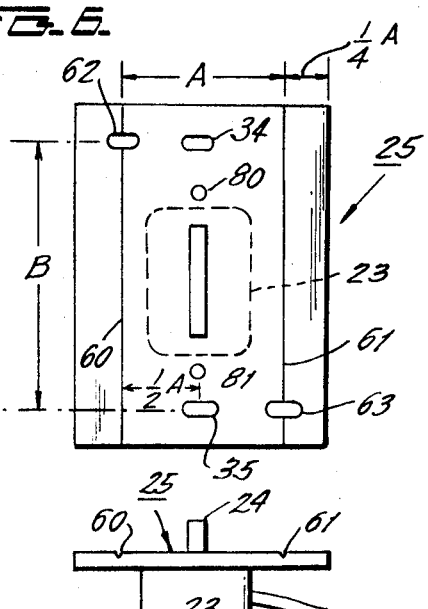
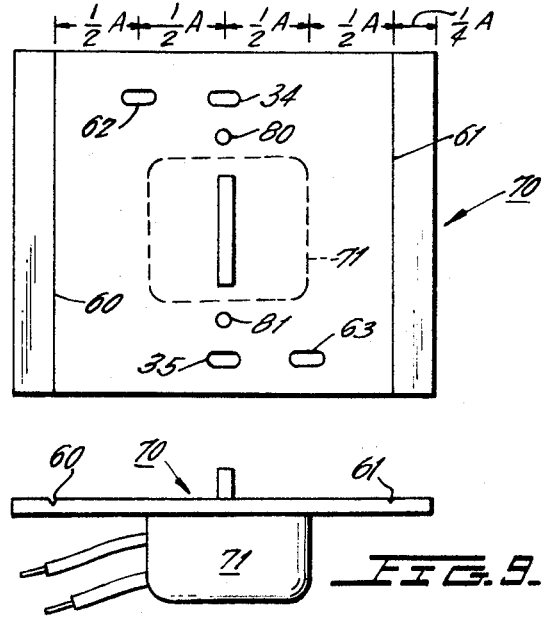
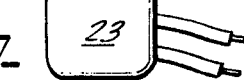

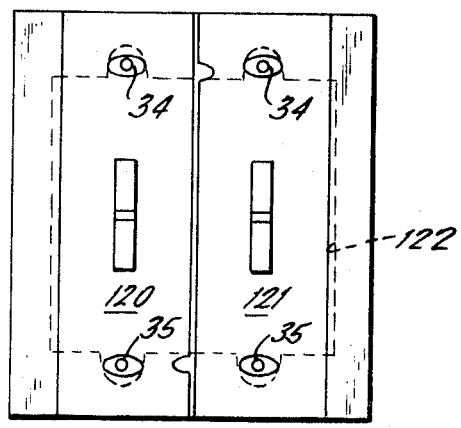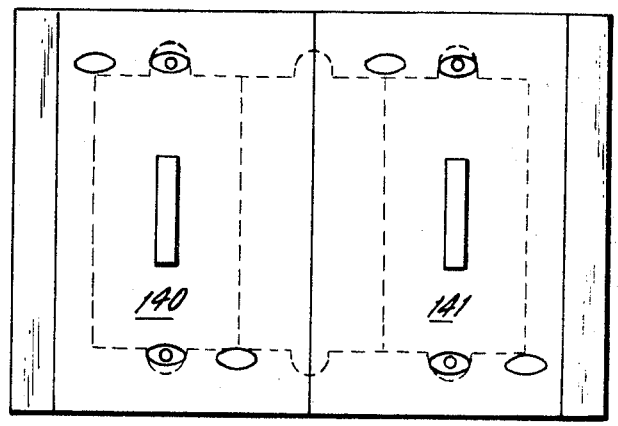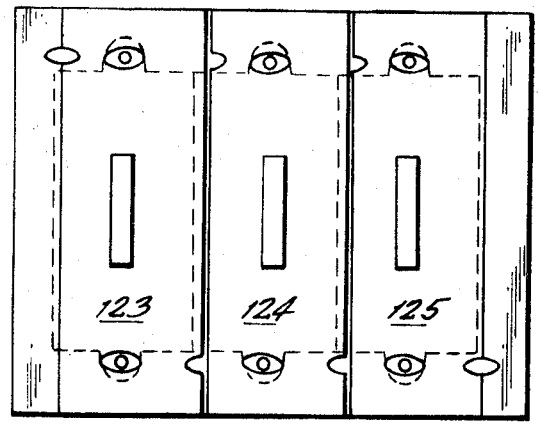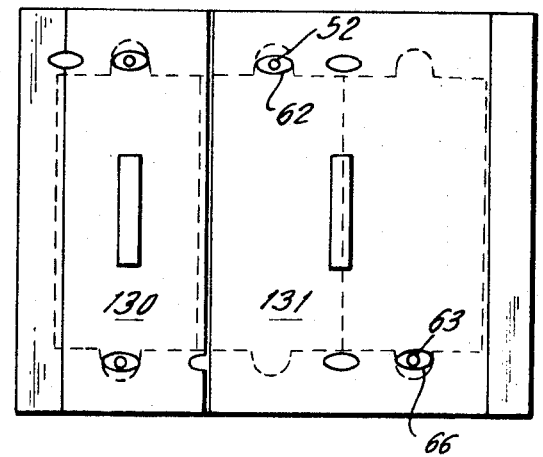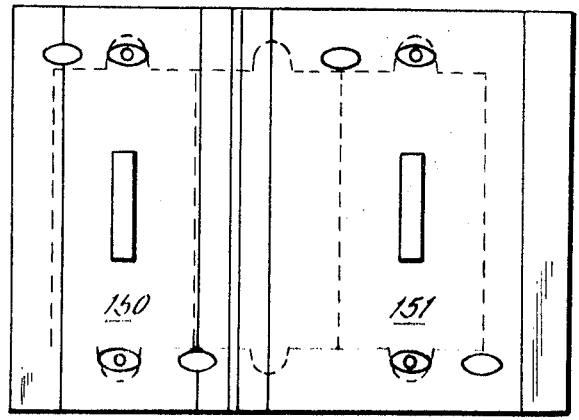

HEAT SINK WALL PLATE WITH OFF-CENTER MOUNTING OPENINGS

RELATED APPLICATIONS

This application is related to copending application Ser. No. 189,896, filed Oct. 18, 1971, in the names of Joel S. Spira and Joseph Licata, entitled DIMMER SWITCH WITH LINEARLY MOVABLE CONTROL, and assigned to the assignee of the present invention.

BRIEF SUMMARY OF THE INVENTION

This invention relates to a novel construction for the face plate which carries a light switch assembly which is to be contained within a conventional wall box, and more specifically relates to a novel arrangement for the screw-receiving openings which mount such plates within a wall box and for frangible side sections for the plate which permit the ganging of various sized wall plates into any sized wall box. Different combinations of switches can be ganged into a given wall box with or without removal of the frangible sections. The face plate may further be designed for use with a single position wall box, where the face plate overlaps the wall edges surrounding the opening receiving the wall box.

A single pair of vertically aligned openings of conventional design are provided in the plate for receiving screws which mount the plate and switch within the single wall box. Frangible side sections are then provided adjacent the vertical sides of the plate, with the spacing between the fracture lines of the frangible sections being equal to the spacing between vertically aligned screw-receiving openings in the multiple switch wall box. Mounting openings may be further disposed within these fracture lines. It is also possible to space the fracture lines by some multiple of the conventional wall box screw spacing to provide a larger heat sink for a higher rated device. With this design, additional screw-receiving openings spaced from one another by the distance between the screw-receiving openings of a conventional wall box are also provided.

The face plate may then be formed with fins extending from the outwardly facing surface of the plate for improving the heat radiation and convection characteristics of the wall plate. When such fins are used, the screw-receiving openings which are laterally displaced from the center line of the wall plate need not be provided in vertically aligned pairs, but can be arranged with only a single opening on either laterally displaced line, thereby simplifying the problem of machining openings through a finned surface.

BRIEF DESCRIPTION OF THE DRAWINGS

FIG. 1 is a cross-sectional view of a conventional wall box sized to receive two side-by-side switches.

FIG. 2 is a cross-sectional view of FIG. 1 taken across the section line 2 — 2 in FIG. 1.

FIG. 3 is a front plan view of a conventional single switch wall box when facing the wall.

FIG. 4 is similar to FIG. 3, but shows a double wall box of conventional type.

FIG. 5 is similar to FIGS. 3 and 4, but illustrates a triple switch wall box.

FIG. 6 shows a conductive switch having a mounting plate constructed in accordance with the present invention which is to be mounted in wall boxes of the type shown in FIGS. 3, 4 and 5.

FIG. 7 is an end view of the switch of FIG. 6.

FIG. 8 shows an enlarged switch plate for increasing the effective heat sink volume of the switch plate as compared to the device of FIG. 6.

FIG. 9 is an end view of the switch of FIG. 8.

FIGS. 10 to 14 show front plan views of different combinations of ganged switches mounted in various types of wall boxes.

FIG. 15 is a top plan view of a mounting plate similar to that shown in FIGS. 6 and 7 wherein the front surface of the heat sink is finned.

FIG. 16 is an end view of the heat sink of FIG. 15.

FIG. 17 is an enlarged view of a portion of the heat sink of FIG. 16 to illustrate the groove detail which permits the snapping off of a vertical section of the plate.

DETAILED DESCRIPTION OF THE PREFERRED EMBODIMENT

Referring now to the drawings and particularly to FIGS. 1 and 2, there is schematically illustrated a wall section 20 which could, for example, be a conventional plaster wall having a cavity 21 therein which receives a conventional metal box 22 adapted for receiving electrical switches used to control lighting or the like. Leads (not shown) from the house wiring circuits are brought into the wall box 22 to be connected to the switch or dimmer devices which are mounted therein.

FIGS. 1 and 2 illustrate a switch housing 23 which may be of any conventional type, and has an operating member 24 extending therefrom which could be a movable switch arm, or the like, which causes operation of the device 23. The device 23 is suitably mounted to a conductive wall plate 25 and may be so arranged that it overlaps the edge surfaces of cavity 21 in the wall 20. An additional decorative cover plate could also be used to cover the surface of plate 25 if desired.

FIG. 1 shows two such assemblies mounted within wall box 22 where the wall box 22 of FIG. 2 is a two switch size and would conventionally receive two switches side by side. As shown particularly in FIG. 2, the wall box is provided with screw-receiving sections, for example, sections 30 and 31 which receive appropriate mounting screws 32 and 33 which extend through openings 34 and 35, respectively, in the wall plate 25.

The location of the various screw-receiving openings for wall boxes for receiving switches has been standardized as illustrated for three conventional wall boxes illustrated in FIGS. 3, 4 and 5.

FIG. 3 shows the conventional single switch wall box 40 which will have screw-receiving members 41 and 42 disposed in a vertical central line through the center of the wall box 40. Openings 41 and 42 will be vertically spaced from one another by a fixed standard distance, for example, 3 ⅜ inches.

In the conventional two switch wall box, which was illustrated in FIGS. 1 and 2, and as further shown in FIG. 4, there will be two pairs of vertically aligned openings including the pair of openings in screw-receiving members 30 and 31 of FIGS. 1 and 2, and the further vertically aligned pairs of openings 43 and 44. The vertical lines joining these pairs of openings are spaced from one another by a distance A.

The distance between the center line joining these pairs of openings to the adjacent vertical edge of the wall box is one-half A, as in the case of the single box of FIG. 3. Similar spacings are used in the three switch box of FIG. 5 which is provided with three pairs of vertically aligned screw-receiving members 50–51, 52–53 and 54–55. Thus, each pair of vertically aligned screw-receiving openings is spaced from the adjacent pair by the distance A and the end pairs are spaced from an end of the box by the distance one-half A. Note also that the distance between vertically aligned screw-receiving elements of each pair is the distance B in all of FIGS. 3, 4 and 5. Still larger wall boxes for receiving four and more switches will have additional screw-receiving pairs aligned vertically with one another and spaced in the manner shown in FIGS. 4 and 5.

In accordance with the present invention, a wall plate has been formed, as shown in FIGS. 6 and 7, as well as in FIGS. 1 and 2, wherein the wall plate 25 has conventional screw-receiving openings 34 and 35 vertically aligned above one another and spaced from one another by the distance B. Note that the plate of FIG. 6 is longer than many conventional plates so that it will be sufficiently high to overlap the exterior of the wall box opening.

The width of plate 25 is such that it will normally be wider than the width of a single wall box (which has the width A in FIG. 3) so that the plate will overlap the vertical sides of the conventional wall box and wall opening receiving the wall box. Two parallel grooves 60 and 61 (FIG. 7) are then formed in the plate 25 which are spaced from one another by a distance A. Grooves 60 and 61 form frangible end sections which can be broken off, which sections have a width of one-fourth A. In accordance with the invention, an opening 62 is formed on the groove 60 at the height of opening 34 while a second opening 63 is formed on the groove 61 at the height of opening 35. It is not essential that openings 62 and 63 be formed on a groove but it is only essential that their lateral spacing be the distance A for reasons which will hereinafter become apparent. It should be noted that, in the past, opening 62 would have been formed as one of a pair of vertically aligned openings, wherein a further opening would appear below opening 62 at the level of opening 35 and that opening 63 would have been prepared as one of a pair of openings. It will be seen hereinafter that these further additional openings are unnecessary when mounting the switch in any conventional wall box.

FIG. 8 demonstrates that the switch plate can have a larger area shown by the larger area switch plate 70, which could be used in connection with a higher current rated switch device 71 than the switching device 23 of FIGS. 1, 2, 6 and 7. By way of example, the wall plate of FIGS. 6 and 7 could be for a switch having a rating of 600 to 1,000 watts, while the wall plate of FIGS. 8 and 9 is for a switch rated at from 1,500 to 2,000 watts.

The switch plate 70 contains the conventional mounting openings 34 and 35 and further contains openings 62 and 63, described previously in connection with FIG. 6, where the openings 62 and 63 are laterally spaced from one another by the distance A. The plate of FIG. 8, however, has its snap-off grooves 60 and 61 further laterally spaced from openings 62 and 63 by the distance one-half A.

It should be noted that the wall plates of FIGS. 6 and 8 can contain other openings therein, such as threaded screw-receiving openings for receiving the screws used to mount decorative wall plate covers and the like. Typically, conventional screw-receiving openings 80 and 81 can be formed on the vertical center line of each plate for receiving conventional wall plate cover screws.

It is now possible to consider the manner in which the novel plate construction shown in FIG. 6 or 8 is advantageously used for the mounting of single switches or plural switches of various types with or without the snap-off sections in place and into any type of wall box even though the switch uses an overlapping plate configuration in which the mounting plate overlaps the wall box opening.

It will be apparent that the switch plate of FIG. 6 or 8 can be mounted directly into the single switch wall box of FIG. 3 where mounting screws extend through the conventional aligned openings 34 and 35 in wall plate 25 and into the screw-receiving members 41 and 42 of the wall box 40 in FIG. 3. Similarly, the larger wall plate of FIG. 8 could be mounted in the single box configuration of FIG. 3. When mounted in this manner, the diagonally disposed openings 62 and 63 are not used.

FIG. 1 shows how two switches of the type shown in FIG. 6 can be mounted in the wall box of FIG. 4. Thus, the installer need only snap off vertical sections at grooves 60 and 61, respectively, of the plates of two switches, shown at the right and left, respectively, in FIG. 1, so that the two switches may now be mounted within a common wall box while still having an overlapping relationship with respect to the wall opening. This arrangement is shown in FIG. 10 for switch plates 120 and 121 which are mounted in two position box 122. The conventional openings 34 and 35 of plates 120 and 121 are still used for mounting into the vertically aligned openings of the switch box 122.

Three switches of the type shown in FIG. 6 can be mounted in the wall box of FIG. 5. This arrangement is shown in FIG. 11 where the left-hand switch 123 has its right-hand vertical section snapped off and with the central switch 124 having its both left and right-hand sections snapped off, and with the right-hand switch 125 having its left-hand section snapped off.

It may be desired to mount a single switch of the type shown in FIG. 8 in the double box of FIG. 4. Thus, while the centrally disposed opening pair 34 and 35 of the single switch do not communicate with any of the screw-receiving pairs in the two switch box, opening 62 will align with screw-receiving member 30 within the box while opening 63 will align with screw-receiving means 44 within the box. Accordingly, it is possible to mount a higher rated switch arrangement of FIGS. 8 and 9 in a conventional double box which could not be done in the past without special preparation of the switch plate.

It is also possible to use the relatively small switch size of FIG. 6 with one relatively large switch size shown in FIG. 8 in the three switch box of FIG. 5. Thus, as shown in FIG. 12, switch 130, which may be a switch of the type shown in FIG. 6, can have its right-hand breakable section removed and screws may be used to secure the switch in position. Thus, with reference to FIGS. 5 and 6, plate 25 would be secured within the box of FIG. 5 by screws which cooperate with openings 34 and 50 and with openings 35 and 51 in the plate and wall box, respectively. The larger switch 131 of FIG. 8, as shown in FIG. 12, may then be mounted by snapping off the left-hand section defined by groove 60 in FIG. 8, with screws cooperating between opening 62 and screw-receiving member 52 and opening 63 and screw-receiving member 66.

FIG. 13 illustrates the manner in which two of the larger rated switches 140 and 141 could be mounted in a three position box with the adjacent break-off sections of the plates of switches 140 and 141 removed.

FIG. 14 illustrates that two differently rated switches 150 and 151 (corresponding to the switches of FIGS. 6 and 8, respectively) could be mounted in a three position box as in FIG. 12 without break-offs, thereby to maintain the largest possible heat sink area for each of the switches 150 and 151. It is to be noted that ganging without break-off has never been done in the past.

Thus, a diverse mixture of different size switch wall plates can be accommodated in different size wall boxes through the use of the present invention. Note that various combinations of arrangements of switches can be made in switch boxes of any number of switch positions.

It is possible to chart the various combinations of 600/1,000 watt switches (FIG. 6) and 1,500/2,000 watt switches (FIG. 8) which could be mounted in different size wall boxes. Thus, the following chart shows various combinations which could be used, either with or without break-offs. Thus, by reading horizontally under the columns labeled "WITH BREAK-OFF SECTION(S) REMOVED," and "WITH BREAK-OFF SECTION(S) INTACT," the chart gives the number of each of the two units which can be used for a given number of wall boxes.

| Wall Boxes Required | With Break-off Section(s) Removed 600/1000W | 1500/2000W | With Break-off Section(s) Intact 600/1000W | 1500/2000W |
| --- | --- | --- | --- | --- |
| 1 | 1 |   | 1 |   |
|   |   | 1 |   | 1 |
| 2 | 2 |   |   |   |
| 3 | 3 |   | 1 | 1 |
|   |   | 2 |   |   |
|   | 1 | 1 |   |   |
| 4 | 4 |   | 3 |   |
|   | 2 | 1 |   | 2 |
| 5 | 5 |   | 2 | 1 |
|   |   | 3 |   |   |
|   | 1 | 2 |   |   |
|   | 3 | 1 |   |   |
| 6 | 6 |   |   | 3 |
|   | 2 | 2 | 1 | 2 |
|   | 4 | 1 | 3 | 1 |
| 7 | 7 |   | 5 |   |
|   |   | 4 | 2 | 2 |
|   | 1 | 3 |   |   |
|   | 3 | 2 |   |   |
|   | 5 | 1 |   |   |

In the above chart, the arrangement of FIG. 10 is found at the location for 2 wall boxes and 2 switches with break-off. The arrangement of FIG. 12 is found at 3 wall boxes, with break-off, and one of each type of the two different switches. The arrangement of FIG. 14 is found at 3 wall boxes, without break-off, and one of each switch type. The table can be further used to predict all varieties of possible switch combinations made possible by the invention.

FIGS. 15, 16 and 17 describe a particular switch plate of the type shown in FIG. 8 which incorporates fins therein, in the manner shown in copending application Ser. No. 189,896 specially adapted for use with a linearly adjustable potentiometer. More specifically, in FIGS. 15, 16 and 17 there is illustrated a plate 90 which has a plurality of fins, such as fins 91, 92 and 93, extending therefrom to increase the current rating for the switch device to be carried by the plate. By way of example, the plate of FIGS. 15, 16 and 17 is designed for a switch having a 2,000 watt rating. The plate may be an extruded aluminum heat sink having a base thickness of about 0.093 inch, and wherein the fin thickness is about 0.063 inch, and wherein the larger fins have a length of about 0.370 inch. The four centrally disposed fins, including fin 92, are foreshortened and serve a slider support function (which is not important to the understanding of the present invention), as is fully disclosed in the above-noted copending application Ser. No. 189,896. It will also be noted that certain pairs of opposed fins have grooves extending along their length such as the grooved surfaces 94 and 95 in FIGS. 15 and 17 to serve as screw-receiving members for the reception of mounting screws and the like. The use of such grooves is not necessary to the practice of the present invention.

Laterally elongated openings, such as openings 96 and 97, which are vertically aligned with one another, and openings 98 and 99, which are laterally spaced from the line containing openings 96 and 97, are then formed in the plate 90. If desired, these openings could be circular in shape. Note that the finned sections adjacent these openings are removed. Additional small openings are formed throughout the plate for the reception of various mounting elements of the switch device proper which are unimportant to an understanding of the present invention. Finally, the two grooves 100 and 101 are formed in the plate to define lines for easy breakage of a side section of the plate so that the plate may be mounted in the manner described above in connection with the plates of FIGS. 6 and 8.

Although there has been described a preferred embodiment of this novel invention, many variations and modifications will now be apparent to those skilled in the art. Therefore, this invention is to be limited, not by the specific disclosure herein, but only by the appended claims.

The embodiments of the invention in which an exclusive privilege or property is claimed are defined as follows:

1. A conductive plate for mounting a switch; said conductive plate having first and second generally parallel surfaces; a switch means mounted on said first surface; said conductive plate having an elongated opening therethrough; said switch means having an operating member extending through said opening and operable from an area communicating with said second surface of said plate; said second surface of said conductive plate having a plurality of parallel fins extending therefrom; said plurality of parallel fins terminating in at least one plane spaced from and disposed generally parallel to the plane of said second surface; said plate being generally rectangular in shape; said plurality of parallel fins extending in a direction generally parallel to one pair of sides of said rectangular plate; mounting openings in said conductive plate adapted to receive mounting screws for mounting said conductive plate in an attitude wherein said parallel fins extend in a vertical plane; said mounting openings including a first pair of openings aligned vertically with one another along the center of said conductive plate and equally spaced from the top and bottom sides of said conductive plate, and third and fourth openings which are respectively spaced by equal distances from said top and bottom sides of said conductive plate, and by equal distances from each of the said one pair of sides of said plate which are perpendicular to said top and bottom sides, whereby said third and fourth openings form points on a line which generally passes through the geometrical center of said plate, and is at an angle, other than zero degrees, to the line joining said pair of openings; said first pair of openings and said third and fourth openings constituting the sole available openings in said conductive plate for the mounting thereof.

2. The conductive plate of claim 1 which includes first and second elongated reduced plate thickness regions extending parallel to said one pair of sides and spaced from said one pair of sides by equal dimensions, thereby to define break-off side sections for allowing a decrease in the width of said plate.

3. A conductive plate and a switch supported thereby on one surface of said conductive plate, which switch is to be mounted in a wall box; said conductive plate being generally rectangular in shape and having mounting openings therethrough for mounting said switch in a wall box; said mounting openings including a first pair of openings aligned vertically with one another along the center of said conductive plate and equally spaced from the top and bottom sides of said conductive plate, and third and fourth openings which are respectively spaced by equal distances from said top and bottom sides of said conductive plate, and by equal distances from each of the pair of sides of said plate which are perpendicular to said top and bottom sides, whereby said third and fourth openings form points on a line which generally passes through the geometrical center of said plate, and is at an angle, other than 0°, to the line joining said pair of openings; said first pair of openings and said third and fourth openings constituting the sole available openings in said conductive plate for the mounting thereof.

4. The conductive plate of claim 3 which includes first and second elongated reduced plate thickness regions extending parallel to said pair of sides and spaced from said pair of sides by equal dimensions, thereby to define break-off side sections for allowing a decrease in the width of said plate.

5. In combination, a wall box for mounting an electrical switch, an electrical switch housing, and a conductive plate for mounting said electrical switch housing; said wall box having spaced wall box mounting openings therein which are disposed on a vertical line through the center of said wall box; said electrical switch housing being mounted on one surface of said conductive plate; said electrical switch housing being disposed inside said wall box; said conductive plate being generally rectangular in configuration and having mounting openings therethrough adapted to cooperate with said wall box mounting openings; said mounting openings in said conductive plate comprising a first pair of openings aligned vertically with one another along the center of said conductive plate and equally spaced from the top and bottom sides of said conductive plate, and third and fourth openings which are respectively spaced by equal distances from said top and bottom sides of said conductive plate, and by equal distances from each of the pair of sides of said plate which are perpendicular to said top and bottom sides, whereby said third and fourth openings form points on a line which generally passes through the geometrical center of said plate, and is at an angle, other than zero degrees, to the line joining said pair of openings; said first pair of openings and said third and fourth openings constituting the sole available openings in said conductive plate for the mounting thereof; said first pair of openings respectively aligning with said spaced wall box openings.

6. The conductive plate of claim 5 which includes first and second elongated reduced plate thickness regions extending parallel to said pair of sides and spaced from said pair of sides by equal dimensions, thereby to define break-off side sections for allowing a decrease in the width of said plate.

7. The combination of claim 6 wherein each of said break-off sections has a lateral width equal to one-fourth of said given width.

8. The combination of claim 5 wherein said wall box has a given width; the lateral spacing between said third and fourth openings equalling said given width.

9. The combination of claim 8 wherein each of said break-off sections has a lateral width equal to one-fourth of said given width.

10. The combination of claim 9 wherein the surface of said conductive plate opposite to said one surface contains vertically extending fins.

11. The combination of claim 5 wherein said wall box has a given width; the lateral spacing between said third and fourth openings equalling said given width; said third and fourth openings being disposed across respective reduced plate thickness sections.

12. The combination of claim 5 wherein said conductive plate overlaps the side edges of said wall box.

13. In combination, a wall box means for receiving electrical switches mounted within a wall, at least a first and a second switch mounted within said wall box means and having first and second rectangular conductive plate means respectively positioned generally in abutment and adjacent one another for covering said wall box means and being generally parallel to and co-extensive with the plane of the outer surface of the wall receiving said wall box means; each of said first and second switches having operating means extending through said first and second conductive plate means respectively; said wall box means having a width equal to some integral number times a given dimension A and having laterally spaced mounting screw openings therein for receiving a number of switches equal to said integral number; said first and second conductive plate means each having a lateral width dimension of 1.5 A; and mounting means for securing said first and second conductive plate means to a respective pair of said spaced mounting screw openings in said wall box means.

14. The combination of claim 13 wherein each of said first and second conductive plate means contain first and second frangible side sections; said first and second frangible side sections having a width of one-fourth A.

15. The combination of claim 14 wherein said wall box means includes at least first and second individual wall boxes connected to one another, and each having a width equal to said dimension A.

16. In combination, a wall box means for receiving electrical switches mounted within a wall, at least a first and a second switch mounted within said wall box means and having first and second rectangular conductive plate means respectively positioned generally in abutment and adjacent one another for covering said wall box means and being generally parallel to and coextensive with the plane of the outer surface of the wall receiving said wall box means; each of said first and second switches having operating means extending through said first and second conductive plate means respectively; said wall box means having a width equal to some integral number times a given dimension A and having laterally spaced mounting screw openings therein for receiving a number of switches equal to said integral number; said first and second conductive plate means each having a lateral width dimension of 2.5 A; and mounting means for securing said first and second conductive plate means to a respective pair of said spaced mounting screw openings in said wall box means.

17. The combination of claim 16 wherein each of said first and second conductive plate means contain first and second frangible side sections; said first and second frangible side sections having a width of one-fourth A.

18. The combination of claim 17 wherein said wall box means includes at least first and second individual wall boxes connected to one another, and each having a width equal to said dimension A.

19. In combination, a wall box means for receiving electrical switches mounted within a wall, at least a first and a second switch mounted within said wall box means and having first and second rectangular conductive plate means respectively positioned generally in abutment and adjacent one another for covering said wall box means and being generally parallel to and coextensive with the plane of the outer surface of the wall receiving said wall box means; each of said first and second switches having operating means extending through said first and second conductive plate means respectively; said wall box means having a width equal to some integral number times a given dimension A and having laterally spaced mounting screw openings therein for receiving a number of switches equal to said integral number; said first and second conductive plate means having a lateral width dimension of 1.5 A and 2.5 A respectively; and mounting means for securing said first and second conductive plate means to a respective pair of said spaced mounting screw openings in said wall box means.

20. The combination of claim 19 wherein each of said first and second conductive plate means contain first and second frangible side sections; said first and second frangible side sections having a width of one-fourth A.

21. The combination of claim 20 wherein said wall box means includes at least first and second individual wall boxes connected to one another, and each having a width equal to said dimension A.

* * * * *